United States Patent
Amaya

(10) Patent No.: US 7,210,841 B2
(45) Date of Patent: May 1, 2007

(54) ILLUMINATION UNIT AND LIQUID CRYSTAL DISPLAY DEVICE USING THE UNIT

(75) Inventor: Toshio Amaya, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 56 days.

(21) Appl. No.: 10/500,123

(22) PCT Filed: Dec. 25, 2002

(86) PCT No.: PCT/JP02/13492

§ 371 (c)(1),
(2), (4) Date: Jun. 25, 2004

(87) PCT Pub. No.: WO03/056236

PCT Pub. Date: Jul. 10, 2003

(65) Prior Publication Data

US 2005/0018416 A1    Jan. 27, 2005

(30) Foreign Application Priority Data

Dec. 25, 2001 (JP) ............... 2001-391439

(51) Int. Cl.
  *F21V 7/04* (2006.01)
(52) U.S. Cl. ............ 362/632; 362/580
(58) Field of Classification Search ............ 362/632–4, 362/560, 561, 580; 349/58, 62, 65, 60
See application file for complete search history.

(56) References Cited

U.S. PATENT DOCUMENTS

| | | | |
|---|---|---|---|
| 5,182,660 A * | 1/1993 | Tanaka | 349/65 |
| 5,583,681 A * | 12/1996 | Shioya et al. | 349/60 |
| 5,742,366 A | 4/1998 | Imoto | |
| 5,990,989 A * | 11/1999 | Ozawa | 349/61 |
| 6,295,105 B1 * | 9/2001 | Lee et al. | 349/65 |
| 6,667,780 B2 * | 12/2003 | Cho | 349/58 |
| 6,930,737 B2 * | 8/2005 | Weindorf et al. | 349/96 |
| 2002/0030771 A1 * | 3/2002 | Kim | 349/61 |
| 2002/0186333 A1 * | 12/2002 | Ha et al. | 349/58 |

FOREIGN PATENT DOCUMENTS

| | | |
|---|---|---|
| JP | 09-171173 | 6/1997 |
| JP | 11-204973 | 7/1999 |
| JP | 2000-148028 A | 5/2000 |
| JP | 2001-75096 A | 3/2001 |

OTHER PUBLICATIONS

Office Action, dated Jan. 1, 2006.

* cited by examiner

*Primary Examiner*—Renee Luebke
*Assistant Examiner*—Gunyoung T. Lee
(74) *Attorney, Agent, or Firm*—McDermott Will & Emery LLP

(57) ABSTRACT

The liquid crystal display device is provided with: light sources; light guiding plate for guiding light from the light sources to a direction of a liquid crystal panel; reflection sheet to cover the light guiding plate and light sources; frame portion for supporting the light guiding plate and light sources, both of which are covered with the reflection sheet (lighting element), from the upper side of the lighting element; rear face cover for housing the lighting element and fitted with the frame portion; and shield portion disposed between the rear face cover and lighting element. The shield portion is made from high heat conductivity material and shields gaps between the frame portion and rear face cover, gaps between the rear face cover and lighting element, and a plurality of heat discharge holes formed on the bottom of the rear face cover to isolate the display area from the gaps.

7 Claims, 7 Drawing Sheets

ILLUMINATION UNIT AND LIQUID CRYSTAL DISPLAY DEVICE USING THE UNIT

TECHNICAL FIELD

The present invention relates to a lighting unit having a light source provided at a facet of a light guiding plate and a liquid crystal display device using the same.

BACKGROUND ART

In recent years, liquid crystal display devices have frequently been used as display devices of information appliances such as a notebook type personal computer and a word processor and display devices of imaging appliances such as a mobile television, a portable motion picture camera, and a car navigation system owing to its characteristics such as light weight, thin thickness, and low power consumption. In the liquid crystal display devices, generally, a display panel is illuminated with light which is emitted from the rear by an internal lighting unit so as to realize a luminous display screen.

An edge light type lighting unit wherein a light guiding plate is disposed on the rear face of the display panel and a linear light source such as a fluorescent discharge tube is provided at a facet of the light guiding plate is ordinarily used as a backlight of the liquid crystal display device included in the notebook type personal computer and so forth owing to its characteristics of thin thickness and excellent uniformity in luminance on a light emission face.

A conventional edge light type lighting unit UT having fluorescent discharge tubes is shown in FIG. 6, and a liquid crystal display device LD having the lighting unit UT of FIG. 6 is shown in FIG. 7. The lighting unit UT has a tabular transparent light guiding plate 1 for transmitting light, fluorescent discharge tubes 2 separately disposed at two opposing sides out of four sides of the light guiding plate 1, and a reflection sheet 3 for reflecting light emitted from the fluorescent discharge tubes 2 to guide the reflected light to facets D1 of the light guiding plate 1. The facets D1 of the light guiding plate 1 are facets at which the fluorescent discharge tubes 2 are provided, and a facet D2 is a facet at which no fluorescent discharge tube is provided. The rear face and the facets D1 and D2 of the light guiding plate 1 as well as the fluorescent discharge tubes 2 are covered with the reflection sheet 3 to form a lighting element 10. This lighting element 10 is supported by frame portion 9 from its upper side and lateral sides as well as by a box-like rear face cover 8 fitted with the frame portion 9 from its lower side, so that the lighting element 10 is housed in a housing 30 formed of the frame portion 9 and the rear face cover 8. Light correction sheets 4 and 5 are provided on a light emission face of the light guiding plate 1. The lighting unit UT is constituted as described above. Then, a liquid crystal panel 11 and a front cover 12 are mounted on the light emission face of the lighting unit UT. The liquid crystal display device LD is thus constituted.

The reflection sheet 3 reflects light leaking from the light guiding plate 1 to the outside of the unit to return the leaked light to the light guiding plate 1, thereby increasing illumination light to be emitted from the light emission face. A white resin film having a high reflectance is used as the reflection sheet 3. Patterns (not shown) which makes a light diffusion area increased in proportion to distance from the fluorescent discharge tubes 2 serving as the light sources may be printed on the reflection sheet 3. As shown in FIG. 5, the reflection sheet 3 is cut to a predetermined shape so as to cover the rear face and the facets D1 and D2 of the light guiding plate 1 as well as the fluorescent discharge tubes 2, and perforations S are formed on predetermined positions so that the reflection sheet 3 is folded along the rear face and the facets.

Though a periphery of each of the fluorescent discharge tubes 2 (hereinafter referred to as "reflecting portion" 20) and the rear face of the light guiding plate 1 are covered with the reflection sheet 3 in this constitution, the reflection sheet 3 may be divided into sheets for separately covering the reflecting portion 20 and the rear face of the light guiding plate 1 with the divided sheets being adhered to one another with an adhesive double coated tape. The reflection sheet 3 shown in FIG. 6, which continuously covers the reflecting portion 20 and the rear face of the light guiding plate 1, is advantageous in achieving the thin thickness of the lighting unit UT and reducing the cost and the number of steps for assembly of the lighting unit UT.

A diffusion sheet, a prism sheet, and the like may be used as the light correction sheets 4 and 5. The light emitted from the light guiding plate 1 can be diffused or condensed by selecting a sheet to be used for the light correction sheets 4 and 5 among a various types of sheets varied in optical characteristics and by setting the number of sheets as required, thereby achieving uniformity and high luminance of the emitted light.

Each of ends of the fluorescent discharge tubes 2 is connected to lead wires (not shown) by soldering or the like, and the lead wires are connected to a power unit (not shown) such as an inverter for generating a high frequency alternating current. During operation of the lighting unit UT, a voltage required for lighting the fluorescent discharge tubes is applied from the power unit through the lead wires. Generally, a high voltage is required for lighting the fluorescent discharge tubes 2. Accordingly, a rubber holder 7 made from an insulator such as a rubber is attached to each of the fluorescent discharge tubes 2 and around the lead wires so as to protect electrodes of the fluorescent discharge tubes 2 and ensure safety of the lead wires by covering exposed portions thereof.

A plurality of heat discharge holes 15 for discharging heat generated from the fluorescent discharge tubes 2 are formed on the bottom of the box-shaped rear face cover 8. As described in the foregoing, the rear face cover 8 is fitted with the frame portion 9 so as to form the housing 30 for housing the lighting element 10.

The conventional lighting unit UT and the liquid crystal display device LD of the above constitution have gaps 16A formed between the rear face cover 8 and the frame portion 9 fitted with each other. Further, the lighting unit UT and the liquid crystal display device LD have gaps 16B formed between the rear face cover 8 and the lighting element 10. The gaps 16A and 16B are formed due to the constitution of itself. Dust entered the device during and after the assembly of the liquid crystal display device LD enters a display area 25 formed of the liquid crystal panel 11 and the light correction sheets 4 and 5 through the gaps 16A and 16B as well as gaps between the frame portion 9 and the lighting element 10. Also, dust entered the device through the heat discharge holes 15 formed on the rear face cover 8 enters the display area 25 through the gaps 16B and the gaps between the frame portion 9 and the lighting element 10. The dust entered the display area interrupts the output light to cause irregular luminance. Further, the components in the display area 25 such as the light correction sheets 4 and 5 are damaged due to friction with the dust. Moreover, when the dust enters a gap between the liquid crystal panel 11 and the lighting unit UT, it is very difficult to remove the dust without disassembling the display device. Thus, a precaution against the dust entrance is an important issue in maintenance of the liquid crystal display device LD after the assembly.

Further, when the heat generated from the fluorescent discharge tubes 2 during the operation of the lighting unit UT is discharged through the heat discharge holes 15 to outside, the air in the gaps 16B between the rear face cover 8 and the lighting element 10 functions as a heat insulation layer to cause insufficient heat discharge, thereby causing various defects attributable to the heat.

DISCLOSURE OF THE INVENTION

The present invention has been accomplished in view of the above described problems detected with the conventional technology, and an object thereof is to provide a liquid crystal display device capable of preventing dust from entering a display area without fail and a lighting unit to be used for the liquid crystal display device.

In order to attain the above object, a lighting unit of the invention includes: a lighting element having a light source, a light guiding plate having the light source provided at one of facets thereof and guiding light emitted from the light source to emit the light from a light emission face, and a reflector for covering a rear face and the facets of the light guiding plate and the light source; and a housing for retaining the lighting element, wherein a shield portion for preventing dust from entering the lighting element through gaps between the housing and the facets of the lighting element is provided between the housing and the lighting element.

With such constitution, since the gaps between the housing and the lighting element are shielded with the shield portion, dust entered the unit during and after unit assembly is prevented from entering the light emission face of the lighting element through the gaps.

The housing has a frame for supporting the lighting element from a light emission face side and facet sides, a rear face supporter for supporting the lighting element from a rear face side, and heat discharge holes formed on the rear face supporter for discharging internal heat of the unit to outside of the unit; and the shield portion may be disposed between an underside of the lighting element and a bottom of the housing.

With such constitution, since the shield portion is disposed between the rear face supporter of the housing and the lighting element, the dust entered the unit from the heat discharge holes is prevented from entering the light emission face of the lighting element.

The housing has frame portion constituting the frame and being mounted on the light emission face side of the lighting element and rear face supporting portion constituting the rear face supporter and being fitted with the frame portion to house the lighting element; and gaps between the frame portion and the rear face supporting portion may be shielded with the shield portion.

With such constitution, since the gaps between the frame portion and rear face supporting portion are shielded with the shield portion, dust is prevented from entering the light emission face of the lighting element through the gaps.

The shield portion may be tabular and may be disposed in such a fashion that an outer periphery thereof is positioned between an inner periphery and an outer periphery of each of the frame portion of the housing. Alternatively, the shield portion may be in the shape of a box, and may be disposed in such a fashion that an outer periphery thereof is positioned between the inner periphery and the outer periphery each of the frame portion of the housing.

With such constitution, the gaps between the frame portion and the rear face supporting portion constituting the housing are shielded with the shield portion to be isolated from the lighting element, and the heat discharge holes formed on the rear face supporting portion are shielded with a main face of the shield portion to be isolated from the lighting element.

The shield portion may preferably be made from a material having heat conductivity higher than that of the air.

With such constitution, since the shield portion made from the material having heat conductivity higher than that of the air is provided between the rear face supporter of the housing and the lighting element, heat is discharged efficiently from the heat discharge holes to the outside of the unit as compared with the case wherein the gaps filled with the air exist between the rear face supporter of the housing and the lighting element. Therefore, a highly reliable lighting unit wherein various defects caused by the heat are suppressed is realized.

The liquid crystal display device of this invention is provided with the lighting unit having the above-described constitution and a liquid crystal panel disposed on the light emission face of the lighting unit.

With such constitution, dust is prevented from entering a display area due to the above-described effects of the lighting unit. Therefore, the liquid crystal display device is free from non uniform luminance caused by the entrance of dust, and damages on the components in the display area, which can otherwise be caused by the dust, are prevented. Further, since the device is free from the disassembly which is conducted for removing dust entered the display area, easy maintenance of the device is realized.

Alternatively, the liquid crystal display device may be provided with the lighting unit wherein the shield portion made from the material having heat conductivity higher than that of the air is disposed between the lighting element and the rear face supporting portion of the housing.

With such constitution, since the heat discharge is efficiently performed as described above in the lighting unit, various defects caused by the heat are suppressed. Therefore, a highly reliable device is realized.

These and other objects, characteristics, and advantages of the invention will become more apparent from the following detailed description of embodiments to be given with reference to the accompanying drawings.

BEST MODE FOR CARRYING OUT THE INVENTION

Hereinafter, embodiments of the present invention will be described based on the drawings.

First Embodiment

Figure 1:
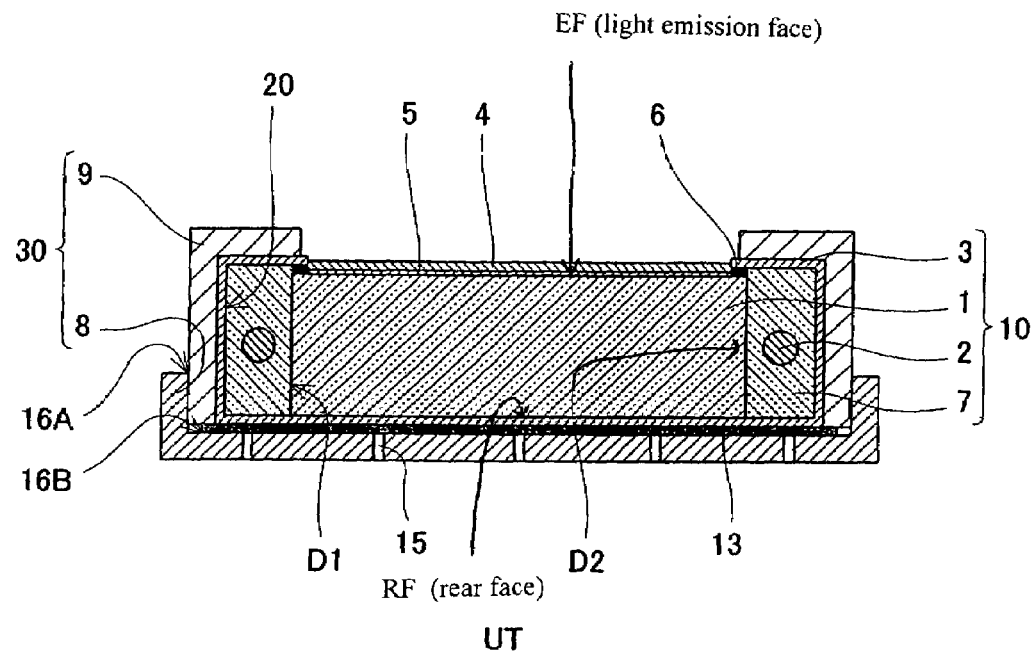
FIG. 1 is a sectional view schematically showing a constitution of a lighting unit according to a first embodiment of the present invention.
Figure 2:
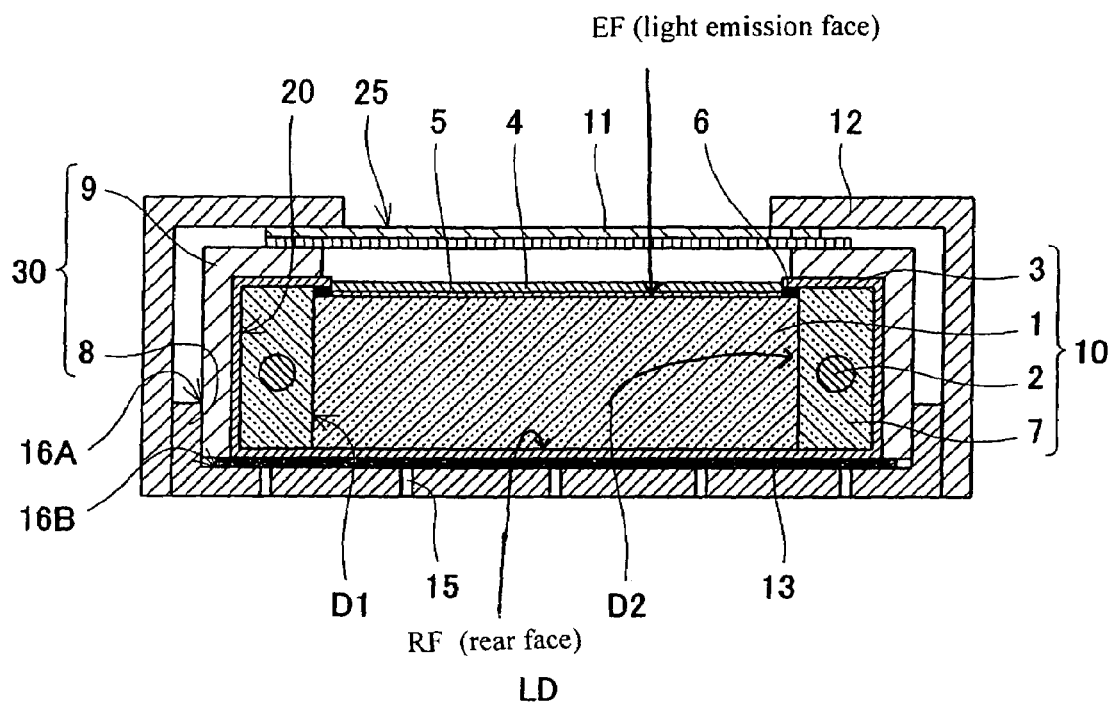
FIG. 2 is a sectional view schematically showing a constitution of a liquid crystal display device having the lighting unit of FIG. 1.

FIG. 1 is a sectional view schematically showing a constitution of a lighting unit according to this embodiment, and FIG. 2 is a sectional view schematically showing a constitution of a liquid crystal display device having the lighting unit of FIG. 1.

As shown in FIGS. 1 and 2, the lighting unit of this embodiment is provided with: fluorescent discharge tubes 2 serving as light sources; a tabular light guiding plate 1 for transferring light from the fluorescent discharge tubes 2 to a liquid crystal panel 11 which will be described later in this specification; a reflection sheet 3 disposed in such a fashion as to cover an underside (a side reverse to a light emission face) and facets D1 and D2 of the light guiding plate 1 as well as peripheries of the fluorescent discharge tubes 2 (reflecting portion 20); frame portion 9 for supporting the fluorescent discharge tubes 2 and the light guiding plate 1 both of which are enclosed by the reflection sheet 3 (the fluorescent discharge tubes 2 and the light guiding plate 1 will hereinafter be referred to as a lighting element 10) from above (from a light emission face side); a box-like rear face cover 8 being fitted with the frame portion 9 and supporting the lighting element 10 from below; and a plate-like shield portion 13 disposed between the bottom of the rear face cover 8 and the lighting element 10. Referring to FIG. 2, the liquid crystal panel 11 and a front cover 12 are disposed on the light emission face side of the lighting unit UT to form the liquid display device LD. In this embodiment, the liquid crystal panel 11 and a region below the region in which the panel is disposed are referred to as a display area 25.

In manufacturing the lighting unit UT having the above-described constitution, the fluorescent discharge tube 2 is attached to each of the facets D1 of the light guiding plate 1 opposed to each other. A lead wire (not shown) is connected to each of ends of the fluorescent discharge tube 2 by soldering or the like, and the lead wires are connected to a power unit (not shown) such as an inverter for generating a high frequency alternating current. Since a high voltage is applied to the fluorescent discharge tube 2 when actuating the lighting unit, a rubber holder 7 made from an insulator such as a rubber is attached around the exposed lead wires (not shown) and the fluorescent discharge tube 2. After that, the rear face of the light guiding plate 1 and the facets D1 and D2 of the light guiding plate 1 including the fluorescent discharge tubes 2 are covered with the reflection sheet 3. After thus forming the lighting element 10 by covering the light guiding plate 1 and the fluorescent discharge tubes 2 with the reflection sheet 3, the frame portion 9 so formed as to enclose the display area are attached to an upper part (on the light emission face side) of the lighting element 10. Thus, the upper part and the lateral parts of the lighting element 10 are supported by the frame portion 9 from the outer periphery. Further, the lighting element 10 to which the frame portion 9 are attached is housed in the box-like rear face cover 8 having a plurality of heat discharge holes 15 formed on its bottom. Here, a shield portion 13 is disposed on the bottom of the rear face cover 8 beforehand, and the frame portion 9 are fitted with the rear face cover 8 so that the lighting element 10 is placed on the shield portion 13. Thus, the lighting element 10 is supported by the rear face cover 8 from below via the shield portion 13. Light correction sheets 4 and 5 are provided on a portion of the light emission face of the light guiding plate 1, which is not covered with the frame portion 9, i.e. on the display area, to complete the lighting unit UT. Then, as shown in FIG. 2, the liquid crystal panel 11 is disposed on the light emission face side of the lighting unit UT, and a front cover 12 which is a type of housing is attached on the liquid crystal panel 11, thereby completing the liquid crystal display device LD.

The light guiding plate 1 is made from a material such as acryl having transmittivity, a refractive index, and like optical characteristics which are optimum for light transmission. On the rear face of the light guiding plate 1, a dot pattern or a groove pattern or the like(not shown), a diffusion area of which is changed depending on distances from the fluorescent discharge tubes 2, is formed.

Figure 3:
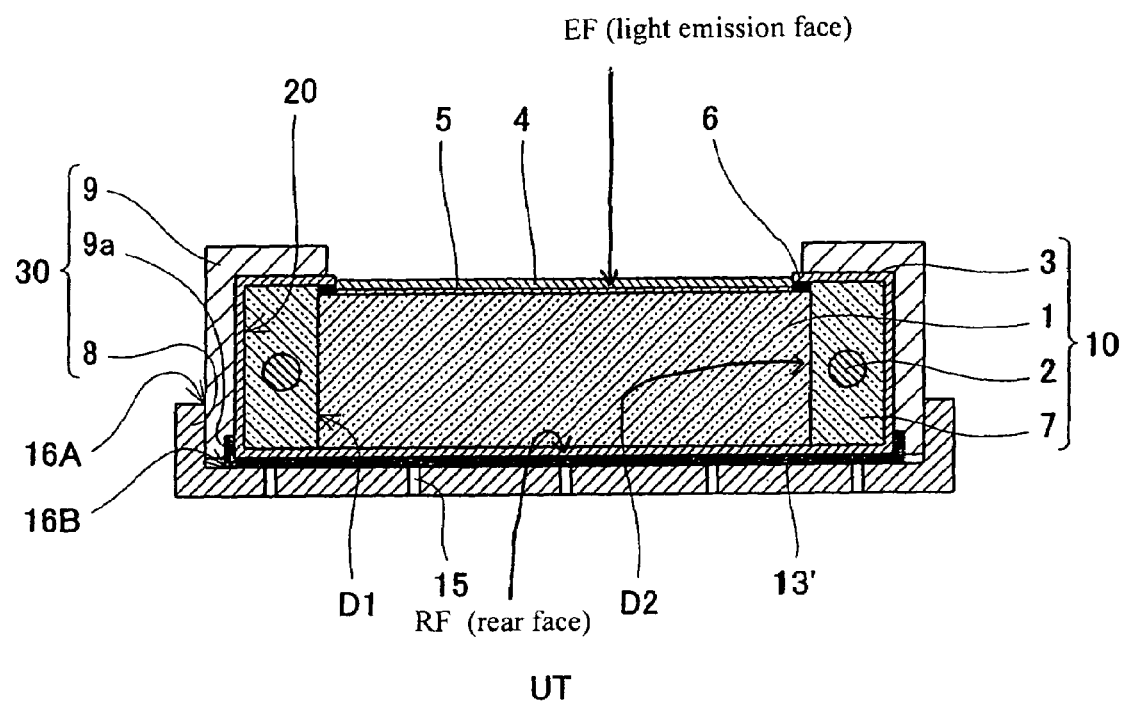
FIG. 3 is a sectional view schematically showing a constitution of a lighting unit according to a second embodiment of the invention.

A white resin film having a high reflectance is used as the reflection sheet 3. In this embodiment, the reflection sheet 3 continuously covers the rear face and the facets D1 and D2 of the light guiding plate 1. More specifically, the reflection sheet 3 which is cut to a predetermined shape and has perforations S formed for the facets D1 and D2 of the light guiding plate 1 as shown in FIG. 3 is used. The reflection sheet 3 extends from the rear face of the light guiding plate 1 to be folded along the facets D1, so that the fluorescent discharge tubes 2 are enclosed by the reflection sheet 3 with the reflecting portion 20 being formed. At the reflecting portion 20, an edge of the reflection sheet 3 is fixed to a periphery of the light emission face of the light guiding plate 1 with an adhesive 6 such as an adhesive double coated tape. On the facet D2 of the light guiding plate 1 where no fluorescent discharge tube is disposed, the reflection sheet 3 extends from the rear face of the light guiding plate 1 to be folded along the facet D2.

The frame portion 9 and the rear face cover 8 are made from a resin material. On the bottom of the rear face cover 8, the heat discharge holes 15 are so formed as to discharge heat generated by the fluorescent discharge tubes 2 during the operation of the lighting unit UT to outside of the unit. By fitting the frame portion 9 and the rear face cover 8 with each other, a housing 30 for housing and supporting the lighting element 10 is formed.

The shield portion 13 has the shape of a flat plate and has such a size as to extend over an outer periphery of the lighting element 10 in a plan view of the lighting unit UT and to be contained in the rear face cover 8. Edges of the shield portion 13 extend over inner peripheries of the frame portion 9 respectively by 1 mm or more and are short of outer peripheries of the frame portion 9. The shield portion 13 is made from a metal material having heat conductivity higher than that of the air ($1.69 \times 10^{-5}$ cal·cm$^{-1}$·s$^{-1}$·deg$^{-1}$), such as aluminum having heat conductivity of $0.487 \times 10^{-5}$ cal·cm$^{-1}$·s$^{-1}$·deg$^{-1}$.

The light correction sheets 4 and 5 disposed on the light emission face side of the light guiding plate 1 serve to achieve uniformity and high luminance of light emitted from the light guiding plate 1, and, in this embodiment, a diffusion sheet 4 and a prism sheet 5 are used therefor. The diffusion sheet is a sheet-like optical member used for diffusing light from the fluorescent discharge tubes 2 to irradiate the liquid crystal panel 11 uniformly with the diffused light. The prism sheet 5 is a transparent resin film having a pattern formed by regularly slotting triangular grooves, which serves to condense the light emitted from the light guiding plate 1 to irradiate the liquid crystal panel 11 with the condensed light. The diffusion sheet 4 and the prism sheet 5 are disposed without being attached to the light guiding plate 1, the reflection sheet 3, and the frame portion 9. In addition, the light correction sheet is not limited to the diffusion sheet 4 and the prism sheet 5, and it is possible to use various sheets varied in optical characteristics as the light correction sheet. The number of the light correction sheets may be changed as required.

During operation of the lighting unit UT, light generated by the fluorescent discharge tubes 2 is made incident to the light guiding plate 1 by way of the facets D1 on which the fluorescent discharge tubes 2 are disposed. Since the peripheries of the fluorescent discharge tubes 2 are covered with the reflection sheet 3, the light reached the reflecting portion 20 from the fluorescent discharge tubes 2 is reflected by the reflection sheet 3 to enter the light guiding plate 1 efficiently without leaking to the outside. Since the rear face of the light guiding plate 1 and the facet D2 of the light guiding plate 1, on which no fluorescent discharge tube 2 is disposed, are covered with the reflection sheet 3, light leaked outside is reflected by the reflection sheet 3 to return to the light guiding plate 1. Since the reflection sheet 3 thus suppresses the leakage of light to outside, an amount of light emitted from the light emission face of the light guiding plate is increased. Further, since the dot pattern or the groove pattern (not shown) for diffusing light is formed on the rear face of the light guiding plate 1, the incident light on the light guiding plate 1 is diffused by the pattern. Therefore, uniformity and high luminance of the light emitted from the light emission face are achieved.

The light emitted from the light guiding plate 1 passes through the diffusion sheet 4 and the prism sheet 5, which are the light correction sheets, to be made incident to the liquid crystal panel 11. The light is made uniform and increased in luminance by the diffusion sheet 4 and the prism sheet 5. The liquid crystal panel 11 performs display by the use of the light thus obtained.

In the lighting unit UT and the liquid crystal display device LD of this embodiment, the shield portion 13 is disposed between the reflection sheet 3 which covers the rear face of the light guiding plate 1 and the rear face cover 8. Therefore, the gaps 16A and 16B as well as the heat discharge holes 15 which can become passages for the dust to enter the display area 25 are shielded with the shield portion 13, so that the display area 25 is inaccessible from the passages. Accordingly, the dust externally entered the gaps 16A after the assembly of the device, the dust existing in the gaps 16A and 16B entering the gaps during the assembly, and the dust externally entering through the heat discharge holes 15 cannot enter the display area 25 because the shield portion 13 shields the passages to the display area 25. Thus, according to this embodiment, the dust is prevented from entering the liquid crystal panel 11 and the light correction sheets 4 and 5 in the display area 25, thereby reducing non uniform luminance and preventing the components in the display area 25 from being damaged by friction with the dust. Further, since it is no longer necessary to disassemble the device for the purpose of dust removal, easy maintenance after the assembly of the device is achieved.

Moreover, with the above-described constitution, since the shield portion 13 is made from the material having high heat conductivity, heat discharge property is improved as compared with the conventional example wherein heat generated in the unit is discharged to the outside from the heat discharge holes 15 via the gaps 16B serving as a heat insulating layer filled with the air. Therefore, various defects otherwise caused by the heat are suppressed.

Though the reflection sheet 3 covering the reflecting portion 20 and the rear face of the light guiding plate 1 by itself continuously is used in this embodiment, it is possible to use another type of the reflection sheet 3 as a modification of this embodiment. For example, it is possible to use a reflection sheet obtained by dividing the reflection sheet 3 into sheets for separately covering the reflecting portion 20 from the rear face of the light guiding plate 1 and attaching the divided sheets to each other with an adhesive or the like.

Further, though the example of using two fluorescent discharge tubes 2 is described in the foregoing, the invention is not limited thereto. The invention is realized by the use of one fluorescent discharge tube, or, the number and the position of the fluorescent discharge tubes may be changed. Also, light sources other than the fluorescent discharge tube may be used.

Second Embodiment

FIG. 3 is a sectional view schematically showing constitution of a lighting unit UT according to the second embodiment of the invention. The reference numerals used in FIG. 1 are also used in FIG. 3 to denote identical or equivalent components.

The lighting unit UT of this embodiment has a structure same as that of the first embodiment and differs in the following points. That is, though the tabular shield portion 13 is used in the first embodiment, a shield portion 13' having the shape of a box is used in this embodiment, and a lighting element 10 is housed in the shield portion 13'. Also, a step 9a is formed at a lower end of an inner periphery of each of frame portion 9, and the steps 9a and the shield portion 13' are fitted with each other. With the above constitution, an effect same as that of the first embodiment is achieved. Further, by disposing a liquid crystal display panel and a front cover on a light emission face side of the lighting unit UT of this embodiment as shown in FIG. 2 of the first embodiment, a liquid crystal display device achieving an effect same as that of the liquid crystal display device of the first embodiment is realized.

Third Embodiment

Figure 4:
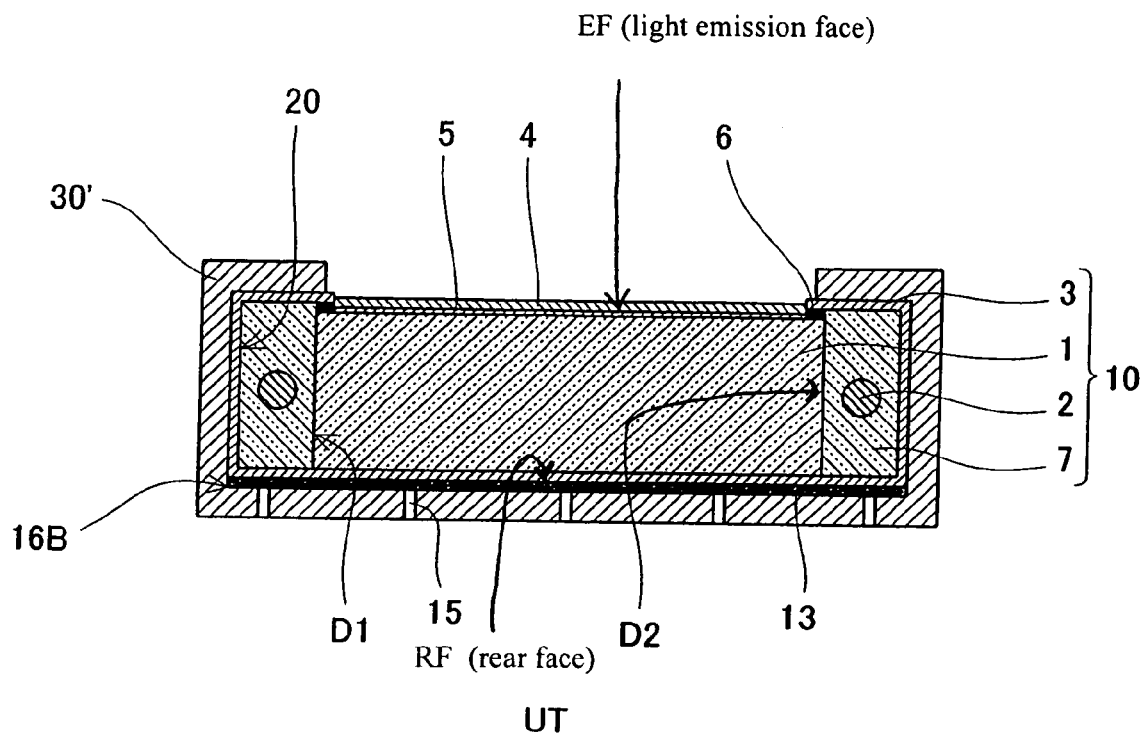
FIG. 4 is a sectional view schematically showing a constitution of a lighting unit according to a fourth embodiment of the invention.
Figure 5:
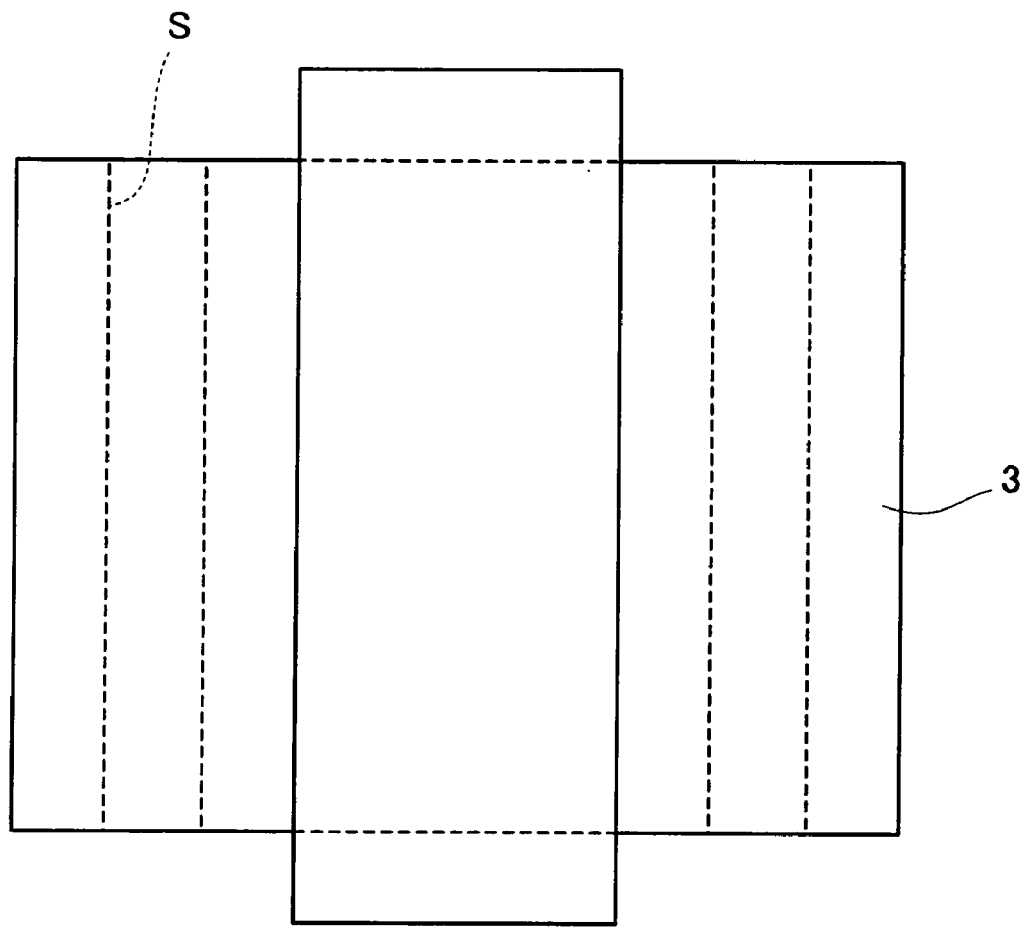
FIG. 5 is a schematic development showing a structure of a reflection sheet used in the lighting unit.
Figure 6:
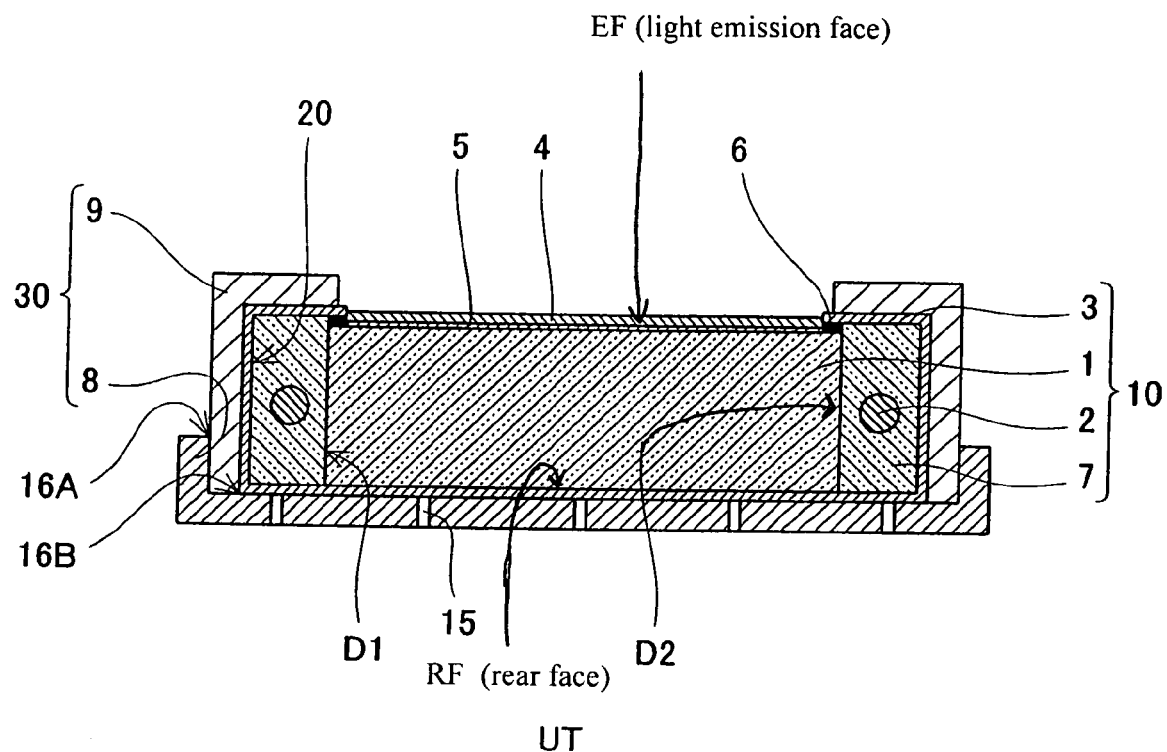
FIG. 6 is a sectional view schematically showing a constitution of a conventional lighting unit.
Figure 7:
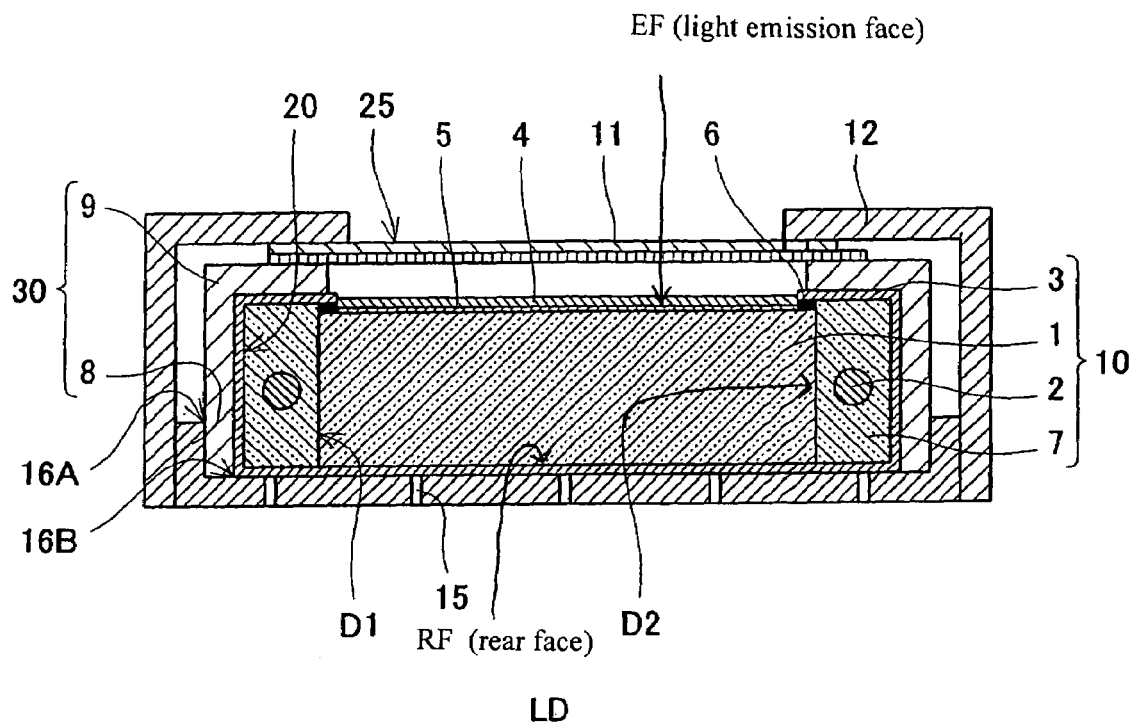
FIG. 7 is a sectional view schematically showing a constitution of a liquid crystal display device having the lighting unit of FIG. 6.

FIG. 4 is a sectional view schematically showing a constitution of a lighting unit UT according to the third embodiment of the invention. The reference numerals used in FIG. 1 are also used in FIG. 4 to denote identical or equivalent components.

The lighting unit UT of this embodiment has a structure same as that of the first embodiment and differs in the following points. That is, though the rear face cover 8 and the frame portion 9 are separately disposed and are fitted with each other to form the housing 30 for housing the lighting element 10, a housing 30' having a structure that frame portion 9 and a rear face cover 8 are integrally formed is provided in this embodiment. A tabular shield portion 13 is fitted on the bottom of the housing 30', and a lighting element 10 is disposed on the shield portion 13. Thus, in this embodiment, the lighting element 10 is housed in the housing 30' so that an upper part, lateral parts, and a lower part thereof are supported.

In this embodiment, the gaps 16A (FIG. 1) between the frame portion 9 and the rear face 8 do not exist, and gaps 16B between the bottom of the housing 30' and the lighting element 10, and heat discharge holes 15 are shielded with the shield portion 13. Therefore, as is the same as the effect of the first embodiment described in the foregoing, an effect of prevention of dust entering and an effect of improvement of the heat discharge are achieved. Further, by disposing a liquid crystal display panel and a front cover on a light emission face side of the lighting unit UT of this embodiment as shown in FIG. 2 of the first embodiment, a liquid crystal display device achieving an effect same as that of the liquid crystal display device of the first embodiment is realized.

As described above, according to the lighting unit and the liquid crystal display device of the invention, dust is prevented from entering the display area of the liquid crystal display device without fail, thereby eliminating non uniform luminance otherwise caused by the dust entrance and preventing damages on the components in the display area otherwise caused by the dust. Further, thanks to the improved heat discharge property, various defects otherwise caused by heat generated during operation are suppressed.

Many modifications and other embodiments are apparent for those skilled in the art from the foregoing description. Therefore, it should be understood that the description are given only by way of example and are presented for the purpose of teaching the best mode of carrying out the invention to those skilled in the art. It is possible to substantially change structure and/or details of function of the invention without departing from the spirit of the invention. For example, though the case of applying the invention to the edge light type lighting unit has been described in the first to the third embodiments, the invention is applicable to other lighting units than the above type.

INDUSTRIAL APPLICABILITY

A lighting unit according to this invention and a liquid crystal display device using the lighting unit are useful as a low profile and small size liquid crystal display device which is used for AV, OA, and communication appliances and a lighting unit thereof.

The invention claimed is:

1. A lighting unit comprising:
   a lighting element provided with, a light guiding plate having a light emission face, facets and a rear face, a light source provided at one of the facets and a reflector covering the rear face and the facets of the light guiding plate and the light source,
   wherein light emitted from the light source is guided into the light guiding plate and is emitted from the light emission face outside the lighting element;
   a housing covering an edge portion of the light emission face, the facets and the rear face of the light guiding plate,
   wherein heat discharge holes discharging heat generated in the lighting unit to the outside of the lighting unit are formed in a region of the housing which is located so as to correspond to the rear face of the light guiding plate; and
   a dust shield portion preventing airflow and
   being provided between at least the rear face of the light guiding plate and the housing so as to cover the heat discharge holes.

2. The lighting unit according to claim 1, wherein
   the housing comprises a frame portion which covers the edge portion of the light emission face and the facets of the light guiding plate, and
   a rear face supporting portion which covers the rear face of the light guiding plate and a lower end portion of the frame portion.

3. The lighting unit according to claim 2, wherein the shield portion is tabular and is positioned in such a fashion that an outer periphery thereof is between an inner periphery and an outer periphery of each of the frame portion.

4. The lighting unit according to claim 2, wherein the shield portion has the shape of a box and is positioned in such a fashion that an outer periphery thereof is between an inner periphery and an outer periphery of each of the frame portion.

5. The lighting unit according to claim 1, wherein the shield portion is made from a material having heat conductivity higher than that of the air.

6. A liquid crystal display device comprising:
   the lighting unit according to claim 5, and
   a liquid crystal panel disposed on the light emission face of the lighting unit.

7. A liquid crystal display device comprising:
   the lighting unit according to claim 1; and
   a liquid crystal panel disposed on the light emission face side of the lighting unit.

* * * * *